United States Patent [19]

Chaput et al.

[11] Patent Number: 5,263,084

[45] Date of Patent: Nov. 16, 1993

[54] SPONTANEOUS CALLER IDENTIFICATION WITH CALL-WAITING

[75] Inventors: Guy J. Chaput, Ontario; Suzanne D. White, Ottawa, both of Canada; Dana A. Merrill, Raleigh, N.C.; William D. Sawyer, Chapel Hill, N.C.; Lester L. White, Raleigh, N.C.

[73] Assignee: Northern Telecom Limited, Montreal, Canada

[21] Appl. No.: 733,027

[22] Filed: Jul. 22, 1991

[51] Int. Cl.$^5$ .................... H04M 3/42; H04M 1/56; H04M 15/06
[52] U.S. Cl. .................... 379/215; 379/127; 379/142; 379/351; 379/421
[58] Field of Search ............ 379/142, 215, 201, 444, 379/127, 100, 351, 421

[56] References Cited

U.S. PATENT DOCUMENTS

| | | | |
|---|---|---|---|
| Re. 31,789 | 1/1985 | Hashimoto ........................... | 179/5.5 |
| 3,133,995 | 5/1964 | Zarouni ............................... | 179/84 |
| 3,584,156 | 6/1971 | Beth ................................ | 179/18 BG |
| 3,727,003 | 4/1973 | Paraskevakos ...................... | 178/28 |
| 3,787,626 | 1/1974 | Subieta .............................. | 179/5.5 |
| 3,812,296 | 5/1974 | Paraskevakos ..................... | 179/18 B |
| 3,963,874 | 6/1976 | Pommerening et al. ........ | 179/18 AB |
| 3,997,731 | 12/1976 | Wilmot et al. .................... | 179/18 B |
| 4,647,723 | 3/1987 | Voorhies ........................... | 379/381 |
| 4,661,975 | 4/1987 | Brecher ............................. | 379/215 |
| 4,873,719 | 10/1989 | Reese ................................ | 379/215 |
| 4,879,743 | 11/1989 | Burke et al. ...................... | 379/142 |
| 4,977,609 | 12/1990 | McClure .......................... | 358/434 |

FOREIGN PATENT DOCUMENTS

| | | | |
|---|---|---|---|
| 0039154 | 3/1983 | Japan ............................... | 379/215 |
| 0070648 | 3/1988 | Japan ............................... | 379/215 |
| 0256358 | 10/1990 | Japan ............................... | 379/215 |

Primary Examiner—James L. Dwyer
Assistant Examiner—Harry S. Hong
Attorney, Agent, or Firm—Foley & Lardner

[57] ABSTRACT

An enhanced telephony call waiting feature is provided wherein identifying information related to a third party wishing to converse with a first party already engaged in a conversation with a second party is spontaneously provided to the first party. The method comprises the steps of the local office sending a call waiting tone having predetermined characteristics to the first party and its apparatus responding thereto by muting its associated handset for a predetermined interval of time. The local office then transmits the identification data relating to the third party and the first party apparatus receives and displays to the first party the identification information related to the third party thereby allowing the first party to either accept or reject the waiting call in the conventional manner but also based on the displayed information.

9 Claims, 2 Drawing Sheets

SPONTANEOUS CALLER IDENTIFICATION WITH CALL-WAITING

FIELD OF THE INVENTION

The invention relates generally to telephone subscriber services and more particularly to an enhanced form of call-waiting service that includes off-hook third party calling number delivery.

BACKGROUND OF THE INVENTION

The call-waiting (CW) telephony feature is generally well-known and has been offered in the last few years by most telephone operating companies. In conventional CW, when a customer who subscribes to CW service is engaged in a telephone conversation with a second party and a third party calls that customer, the customer receives a special call-waiting tone, typically 440 Hz for 300 milliseconds, whereas the third party receives audible ringing. If the CW customer chooses to receive the call from the third party, a switch-hook flash holds the second party while the subscriber's connection is switched to the third party. If the first call-waiting tone is ignored, a second CW tone is given after a few seconds and if this signal is also ignored, the third party is given a busy tone.

Early versions of call-waiting service are discussed in U.S. Pat. No. 3,133,995 to Zarouni whereas later versions are discussed in Pommerening et al., U.S. Pat. No. 3,963,874, George et al., U.S. Pat. No. 3,997,731, Beth, U.S. Pat. No. 3,584,156, and Brecher, U.S. Pat. No. 4,661,975.

When a call-waiting subscriber receives the call-waiting tone(s) he is frequently very reluctant to interrupt the existing conversation for what may be an entirely unsolicited and unwanted call from a third party. However, the CW subscriber would be in a position to make an informed decision if he knew the identity of the third party.

Another customer service presently being introduced to the marketplace is calling number identification (CNID). Early proposed versions of this service may be found in U.S. Pat. Nos. 3,727,003 and 3,812,296 to Paraskevakos, as well as in U.S. Pat. No. 3,787,626 to Subieta. A more recent scheme of CNID is discussed in U.S. Pat. Re. 31,789 to Hashimoto. In these patents, the directory number of a calling party is coded as digital pulse trains and is transmitted from the originating central office to the terminating office and sent to the called party's telephone set either before it is sent an alerting signal such as ringing or during the silent interval between the first and second ringing signals. In these patents, the called party's telephone set must be equipped with receiving circuitry for decoding the digital pulse trains as well as a display device to indicate the identity of the calling party. The called party is then placed in the position of being given the opportunity to answer the call or ignore it.

The contemporary method and protocols of data transfers necessary to the realization of the CNID feature are available from Bellcore Technical References TR-TSY-00030 and TR-TSY-00031. Basically, these specifications require the use of modem data (frequency shift keying - FSK) to transfer the identification information from the central office to the subscriber set during the silent interval between the first and second ringing signals.

Yet another patent related to calling number identification is U.S. Pat. No. 4,873,719 to Reese. This patent is directed to the privacy issue of CNID and proposes to solve the question by granting the calling party exclusive control of the delivery of his identity to the called party. The patent proposes to use conventional call-waiting tones and to deliver the calling party identification information using Dual-Tone Multifrequency (DTMF) data signals while the called party is off-hook.

A first difficulty with this approach is that detection of a conventional call waiting tone in the presence of voice is unreliable at best. Secondly, the appearance of modem data signals (frequency shift keyed data - FSK) or DTMF encoded data signals for a duration of even a few seconds is very annoying to the conversing parties and is thus undesirable.

It is therefore an object of this invention to provide an improved call waiting service to telephone subscribers.

It is also an object of this invention to provide an improved method and apparatus of providing calling party identification information to a called party's telephone set while the latter is off-hook.

It is another object of the invention to provide a robust alerting scheme for use on in-use subscriber loops.

It is yet another object of the invention to provide CNID on a busy telephone line only when the called party's subscriber telephone set is capable of receiving and displaying the information.

It is a further object of the invention to provide this improved call waiting service on analog subscriber lines using non-ISDN (Integrated Services Digital Network) technology.

SUMMARY OF THE INVENTION

In accordance with the invention, there is provided to a first party engaged in a conversation with a second party via a local switching office, identification information related to a third party wishing to converse with said first party. The local office initiates the procedure by sending a call waiting tone having predetermined characteristics to the first party. The first party apparatus responds to the call waiting tone by muting its associated handset for a predetermined interval of time. The local switching office then transmits data corresponding to the said identification information related to the third party. The first party apparatus receives and displays the identification information and thus allows the first party to either accept or reject the waiting call from the third party.

From another perspective, the invention provides a method of transmitting data between a central office and a subscriber terminal having receiving and transmitting transducers while the subscriber terminal is presenting an off-hook condition to the subscriber loop, comprising the steps of sending an alerting tone having predetermined characteristics from the central office to the subscriber terminal to alert the latter that the central office wishes to send data. In response to the alerting tone, the subscriber terminal mutes its handset for a predetermined duration of time corresponding to at least the duration of the data to be transmitted between the central office and the subscriber terminal. Following reception of the data, normal operation resumes.

From yet another perspective, the invention provides subscriber telephone apparatus for receiving third party caller identification while a first party associated with the telephone apparatus is conversing with a second party via a local switching office. The apparatus comprises detector circuit means for detecting the presence of a call waiting tone in the presence of voice signals on the subscriber loop and a control circuit means responsive to the detection of the call waiting tone for muting the receive and transmit transducers for a predetermined period of time during which a receiver and display circuit receives and displays the identity of the third party caller.

In the preferred embodiment of the invention, the call waiting tone and other control tones (beeps) appearing on the subscriber loop are dual-tone signals and the calling number identification data is formatted in accordance with the existing and well-known Bellcore standards with only minor variations as discussed below.

BRIEF DESCRIPTION OF THE DRAWINGS

A more complete understanding of the invention may be obtained from the following description and the accompanying drawings in which.

DESCRIPTION OF THE PREFERRED EMBODIMENT

Figure 1:
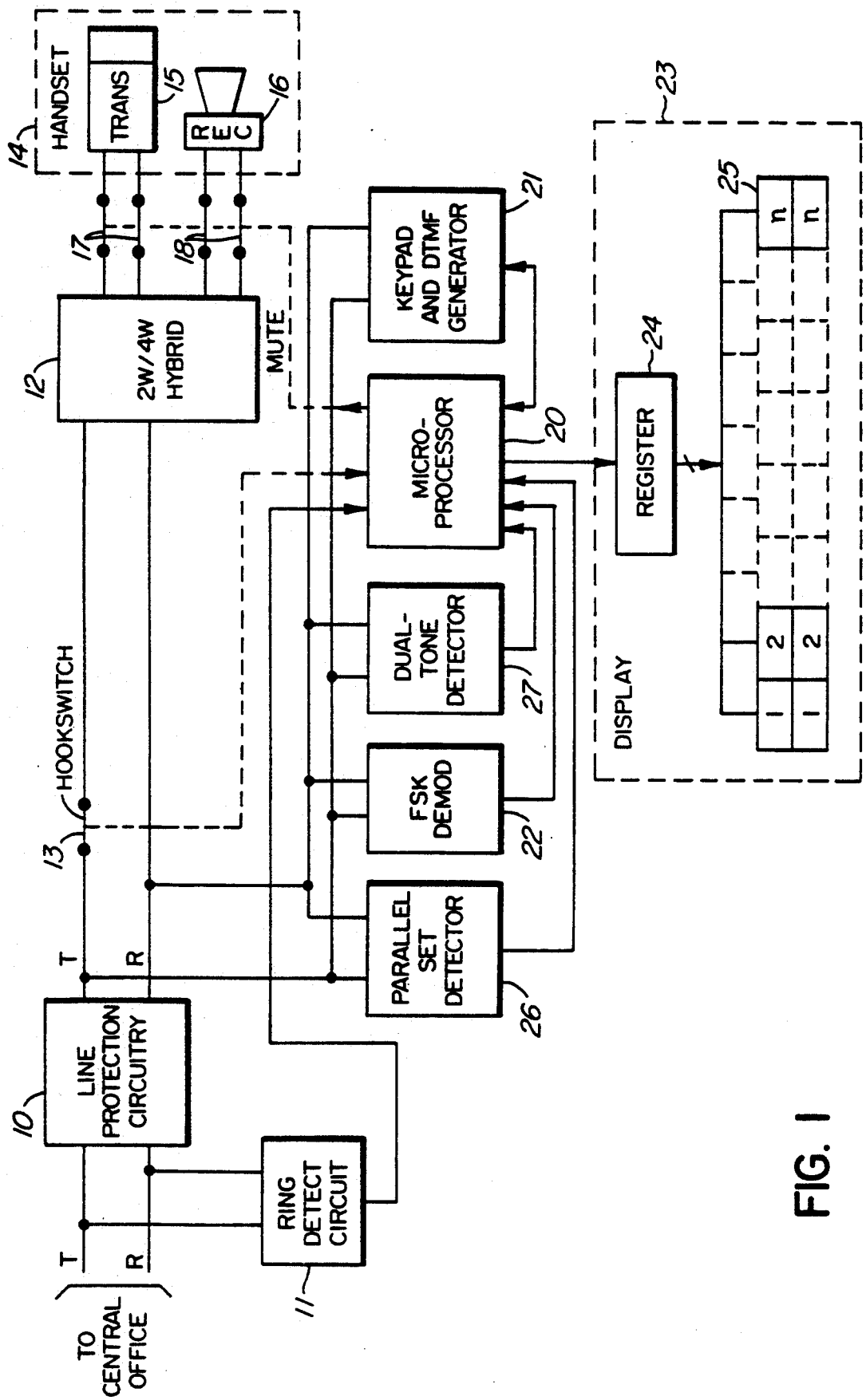
FIG. 1 is a block schematic diagram of a telephone subscriber set in accordance with the invention.

FIG. 1 is a block diagram of at least the portion of a subscriber set necessary to implement the invention. The tip and ring leads of the subscriber loop extend from the subscriber premises equipment shown in FIG. 1 to a local telephone switching office.

As is conventional, the set comprises line protection circuitry 10 connected to a ring detect circuit 11 that may provide visual and/or audible alerting signals to the subscriber that a call has arrived. The line protection circuitry is also connected to a 2 wire/4 wire hybrid circuit 12 via a hookswitch 13. The hybrid circuit 12 is also connected to a handset 14 comprising transmit and receive transducers 15 and 16 respectively. In this case, the hybrid circuit 12 is connected to the transducers 15 and 16 via respective switches 17 and 18 as will be discussed below.

The subscriber set also comprises a control circuit which may conveniently be a microprocessor 20 such as a Signetics type PCD-3348, a conventional keypad and DTMF (Dual-Tone Multifrequency) generator 21, and an FSK (Frequency Shift Keying) demodulator circuit 22 which may be an off-the-shelf unit such as model QM2211 manufactured by the Exar Corporation. The microprocessor 20 is also connected to a display 23 including a register 24 and visual display unit 25 that may comprise one or more rows each having a plurality of cells 1 to n; these are available as off-the-shelf components.

Also connected to the microprocessor 20 and the tip and ring leads are a parallel set detector circuit 26 and a dual tone detector circuit 27. The parallel set detector circuit 26 functions to provide an output signal that indicates whether or not the subscriber set of FIG. 1 is connected with an off-hook extension set. Such a circuit is the subject matter of a patent application bearing Ser. No. 07/631,255, filed in the United States Patent Office and assigned to the same assignee as the present invention.

The dual-tone detector circuit 27 must be suitable to detect the presence of a dual-tone signal such as a DTMF signal in the presence of voice signals on the subscriber loop. U.S. patent application bearing Ser. No. 07/676,593 and also assigned to the same assignee as that of the present invention is suitable to detect reliably the presence of a predetermined tone in the presence of voice signals. Two such circuits connected together are fully capable of reliably detecting a dual-tone signal in the presence of voice signals.

The microprocessor 20 functions as a control hub of the subscriber set by responding to signals from the ring detect circuit 11, the circuits 22, 26, 27 and hookswitch 13 to provide control signals to the muting switches 17 and 18, the DTMF generator 21 and the display 23.

Figure 2:
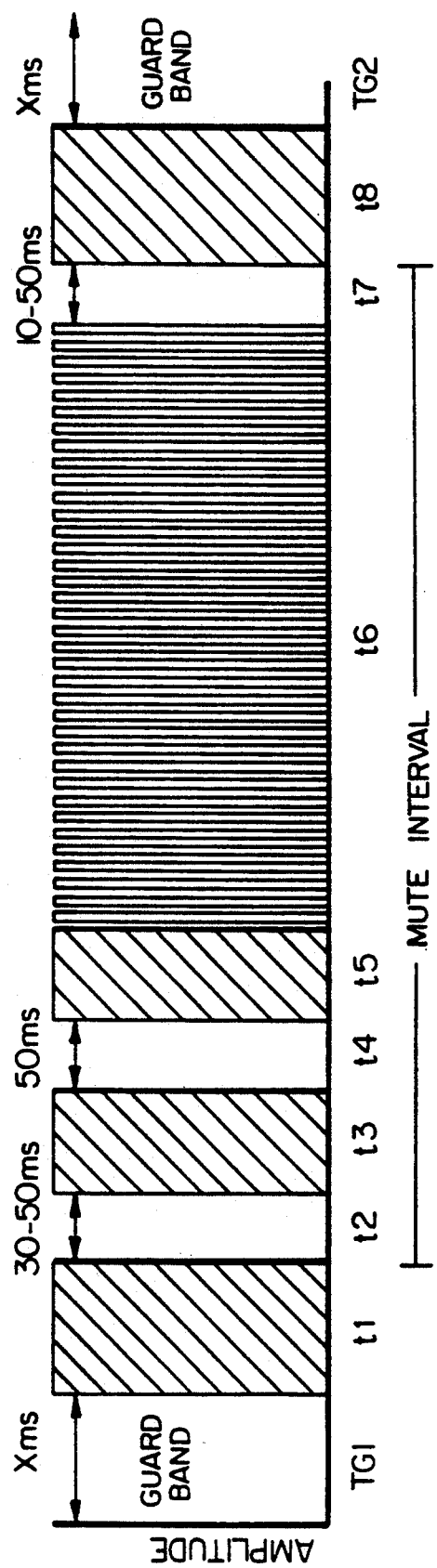
FIG. 2 is a waveform diagram illustrating the sequence of operation of the method of the invention.

The operation of the circuit will be explained using FIG. 2 in conjunction with the circuit of FIG. 1. It will be assumed that a first subscriber associated with the apparatus of FIG. 1 is conversing with a second subscriber via a local central office and that a third party is attempting to reach the first subscriber.

On detecting the incoming call from the third party, the central office prepares to enter the off-hook call waiting procedure of this invention. This is represented by the Xms (x milliseconds) guard band TG1 in FIG. 2. During this period, the call processor of the central office enters a call processing software program associated with the CW feature and it causes the central office to transmit a predetermined dual-tone signal (CW tone) which may preferably be a DTMF signal having a predetermined duration $t_1$ (e.g. 200 milliseconds). As mentioned above, a conventional CW single tone signal may be used but is very difficult to detect reliably in the presence of voice signals.

At this point, the microprocessor 20 in the subscriber set is aware of the off-hook status of the set as well as of any extension set(s) connected to it. During the $t_1$ period, the dual-tone detector circuit 27 detects the presence of the call waiting tone and signals the microprocessor 20 which reacts by muting the handset 14 via switches 17 and 18 and entering a control loop that entails determining the status of any extension set and signalling the DTMF generator 21 to generate an acknowledgement signal $t_3$ on the subscriber loop to inform the central office that it is a subscriber set capable of receiving calling number identification data. Without this signal, the central office would always send the modem data burst to the great annoyance of subscribers using a non-muted set. In the case that an extension set is off-hook, the microprocessor 20 will prevent the acknowledgement signal $t_3$ from being transmitted by not causing it to be generated, thus causing the data transmission sequence at the central office to be terminated. Without the use of this control mechanism, the subscriber on the extension set would hear the modem burst and the control tones and its voice may mutilate the modem data on the subscriber loop. The acknowledgement tone is transmitted in a very quiet period on the subscriber loop since both the first and second subscribers have been muted, the first subscriber by its own set and the second subscriber by the central office in the manner conventional for a call-waiting process. Almost any tone could therefore be used but it is preferable to use a DTMF signal since it is not easily duplicated by random events or voice signals.

During the $t_4$ period, the subscriber set prepares itself to receive data and the central office prepares to transmit the data. Periods $t_5$ and $t_6$ represent the data transmission itself. The signalling method, format and definition of the messages and parameters are defined in the aforementioned TR-TSY-30 standard. The standards requirement of a channel seizure tone is of course not required since the subscriber set is ready to receive. The $t_5$ portion thus consists of X milliseconds (e.g. 150 ms) of logical 1 data to condition the FSK demodulator 22 for receiving the ensuing data which has a period $t_6$ of a length dependent on the amount of data transmitted. This data may correspond to the third party telephone number, name, date, time of day, etc. . . . The FSK data is received by the FSK demodulator circuit 22 which translates it to a digital bit stream that is fed to the microprocessor 20 which translates the data into information displayed on the display 23. The subscriber is then in a position to decide whether or not to accept the waiting call based on the identity of the caller. Acceptance of the waiting call simply entails generating a hookswitch flash in the conventional manner whereas rejection of the waiting call is achieved by ignoring it. If the subscriber ignores the waiting call, the central office may generate a second call waiting alerting tone after a predetermined period. However, the data transmission would not be repeated unless the first transmission was not correctly received. In that case, the acknowledgement tone $t_3$ would be generated but would not be generated otherwise.

During a short interval $t_7$, the circuits at both ends prepare to resume normal operation and the microprocessor 20 unmutes the handset 14 thereby allowing the subscriber to be alerted by a suitable DTMF tone $t_8$ that the conversation may be renewed. After a guard band time TG2 of Xms, the central office is fully recovered from the departure from conventional operation and the conversation may resume.

It will be realized that the time periods discussed are arbitrary and may be predetermined to any value consistent with proper operation.

Although the invention was discussed using a conventional subscriber set into which is integrated special circuitry to realize the invention, the same or equivalent results may be obtained with an adjunct display box containing the described circuitry properly connected to a conventional telephone set.

Numerous other modifications, variations and adaptations may be made to the described embodiments without departing from the scope of the invention as defined in the claims.

What is claimed is:

1. A method of providing to a first party already engaged in a conversation with a second party via a local switching office, identification information related to a third party wishing to converse with said first party, comprising the steps of:
   the local office sending a call waiting tone having predetermined characteristics to the first party;
   the first party apparatus responding to the call waiting tone by muting its associated handset for a predetermined interval of time;
   the first party apparatus responding to the call waiting tone also by transmitting to the local office an acknowledgement tone indicating that it is capable of receiving calling party identification data;
   the local office then transmitting data corresponding to the said identification information related to said third party; and
   the first party apparatus receiving and displaying to the first party said identification information related to said third party thereby allowing the first party to either accept or reject the call from the third party.

2. A method as defined in claim 1 wherein said acknowledgement tone is transmitted only if extension apparatus associated with the first party apparatus is not off-hook.

3. A method as defined in claim 2 wherein following the transmission of said data, the local office transmits an alerting tone to indicate to the first party that the transmission of said data is complete.

4. A method as described in claim 3 wherein the call waiting tone is a dual-tone signal.

5. A method as defined in claim 4 wherein the acknowledgement tone is also a dual-tone signal.

6. A method as defined in claim 5 wherein the alerting tone is also a dual-tone signal.

7. A method as defined in claim 4 and including the further step of, in the instance that the first party has not responded to the first call waiting tone, the local office transmits a second call waiting tone to the first party a predetermined period of time following the termination of the first call waiting sequence but the first party transmits a second acknowledgement tone in response to said second call waiting tone only if said data was not correctly received following the first call waiting tone.

8. Subscriber telephone apparatus for receiving third party caller identification information while a first party associated with the telephone apparatus is conversing with a second party via a local switching office, comprising:
   detector circuit means for detecting the presence of a call waiting tone in the presence of voice signals on the subscriber loop;
   control circuit means responsive to the detection of said call waiting tone for muting the receive and transmit transducers of the telephone apparatus for a predetermined period of time, wherein the control circuit means is further responsive to the detection of the call waiting tone for producing a signal to cause the generation of an acknowledgement signal on the subscriber loop to indicate to the switching office that it is capable of receiving data corresponding to said third party caller identification information; and means for receiving and displaying said third party caller identification information received during said predetermined period of time.

9. Subscriber telephone apparatus as defined in claim 8 and further comprising a parallel set detector circuit, the control circuit means being responsive to a signal corresponding to an extension set being off-hook from the parallel set detector circuit, for preventing the generation of said acknowledgement signal.

* * * * *